Dec. 20, 1955     C. AREND     2,727,348
WINDROWER HAVING CRUSHING AND TEDDING MEANS
Filed June 12, 1953     2 Sheets-Sheet 2

INVENTOR.
Christopher Arend
BY Paul O. Pippel
Atty.

United States Patent Office 2,727,348
Patented Dec. 20, 1955

2,727,348

WINDROWER HAVING CRUSHING AND TEDDING MEANS

Christopher Arend, Berwyn, Ill., assignor to International Harvester Company, a corporation of New Jersey Application June 12, 1953, Serial No. 361,285

4 Claims. (Cl. 56—1)

This invention relates to field forage harvesters and more specifically to a type known as a windrower.

A general object of the invention is to devise a novel windrower which is adapted to pick a wide swath of hay and the like directly from a field and then crush it and then deposit it into a loose narrow windrow.

A more specific object of the invention is to devise a windrower which comprises a forward pickup delivering to a pair of crushing rolls, the rolls discharging into cross conveyors which condense the material while sweeping the material toward the center of the unit in a partially fluffing action and delivering it onto a tedder drum which further beats the mass into a fluffy windrow and deposits it upon the ground.

These and other objects of the invention will become more apparent from the specification and the drawings wherein.

Figure 1:
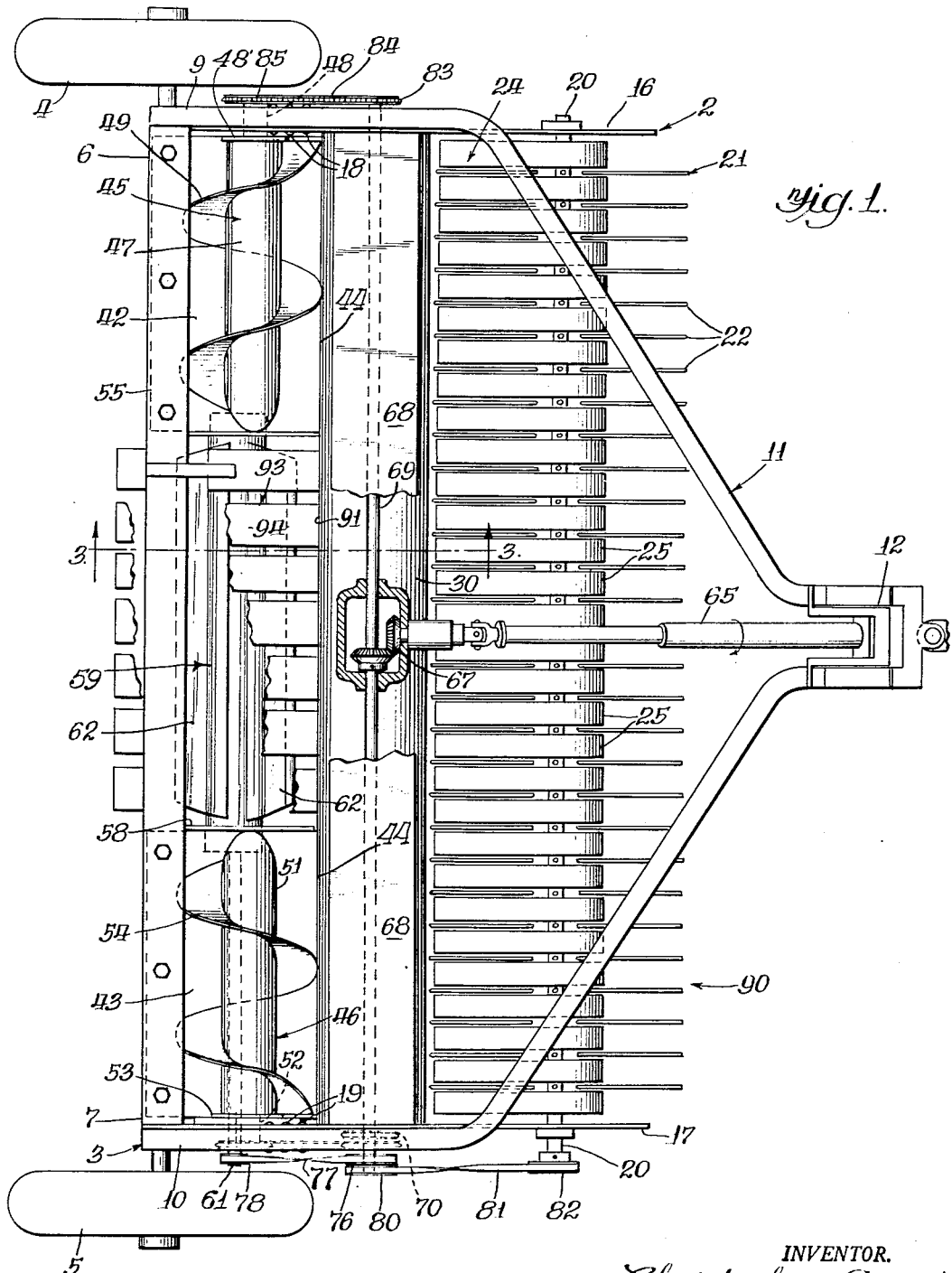
Figure 1 is a plan view of the novel windrower with parts broken away and with parts shown in horizontal cross section.

Describing the invention in detail, the windrower unit generally designated 2 comprises an ambulant field-traversing support structure, generally designated 3, and constitutes a pair of laterally spaced wheels 4 and 5, each of which is disposed at the opposite lateral extremes of the machine 2, the wheel 5 being spindle-supported from a transverse rear beam member 6 and the wheel 5 being spindle-supported from a transverse rear beam member 7. The beam members 6 and 7 are each connected respectively to the lower ends of legs 9 and 10 of an inverted U-shaped hitch, generally designated 11, the legs having a forward convergence to a hitch point 12 for connection to an associated tractor device, such as a drawbar 13 of an associated tractor. The support frame 3 is also provided with a pair of laterally spaced generally horizontal side beam members 14 and 15 which are connected at their rear extremities as by welding to the beams 6 and 7 respectively and project forwardly therefrom.

The beam members 14 and 15 are connected to the lower ends of substantially upright fore and aft extending side panels 16 and 17 respectively and these side panels are further connected to the legs 9 and 10 as by rivets 18 and 19 respectively.

Figure 2:
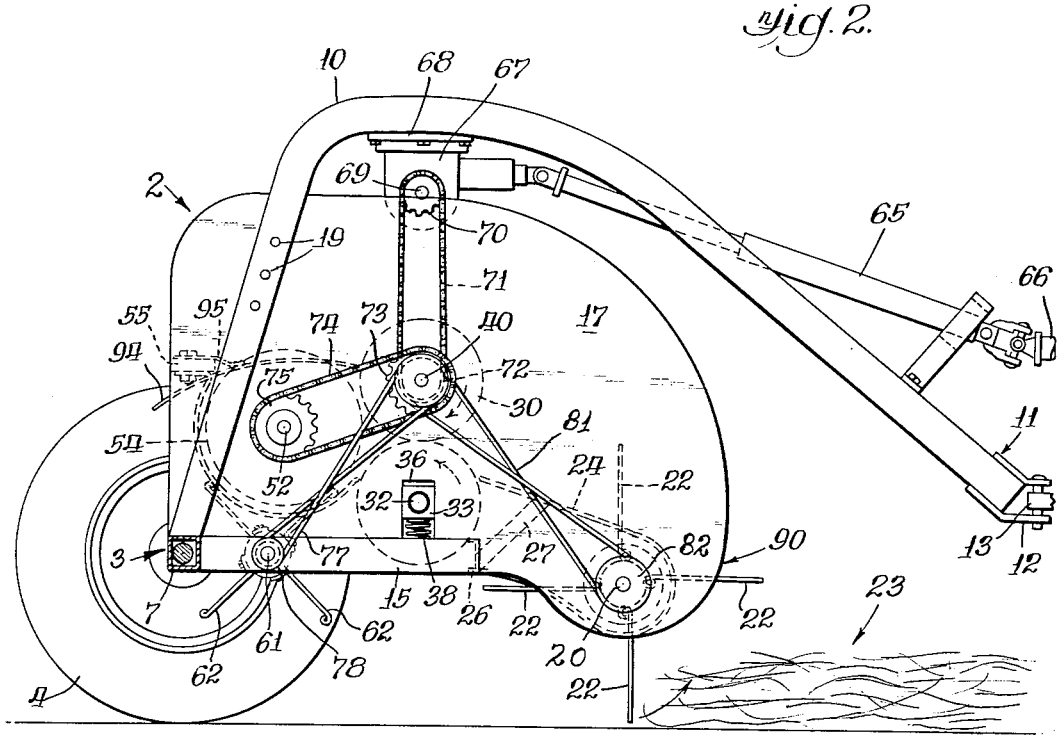
Figure 2 is a side elevational view of the windrower with the rear wheel removed and with the axle structure shown in section.
Figure 3:
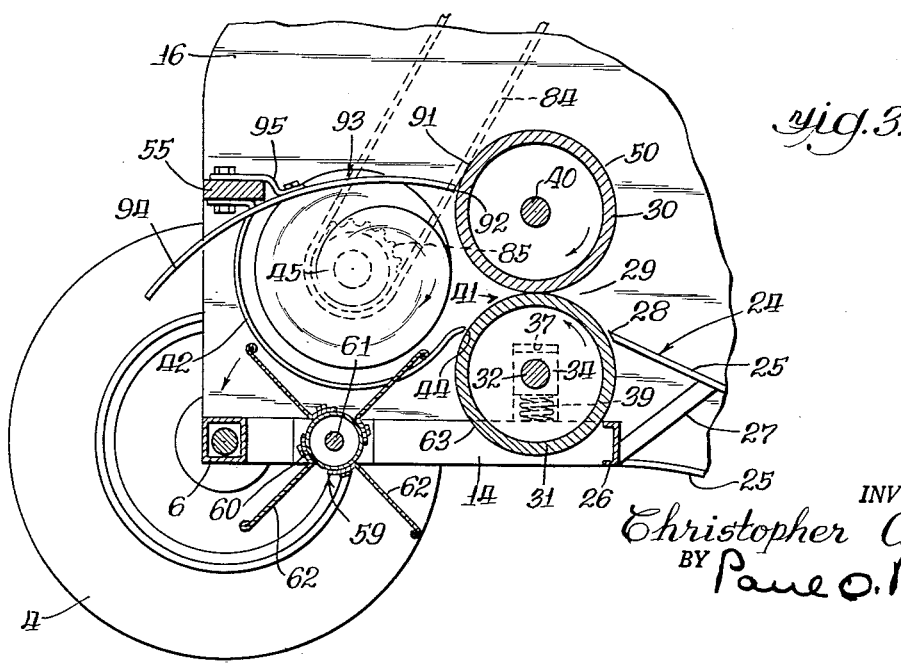
Figure 3 is a cross-sectional view of the windrower taken substantially on the line 3—3 of Figure 1.

The plates 16 and 17 journal between their forward ends a shaft 20 of a pick drum, generally designated 21, the drum 21 being of the conventional spring tooth type and constituted of a plurality of tines 22, 22 spaced axially, the tines being adapted to sweep over the ground and rake the hay, designated 23 in Figure 2, onto a deck, indicated 24, and constituted of a plurality of stripper bars 25, 25, interdigitated with the fingers 22 and wrapped about the drum in stripping relationship to the fingers and carried from the side panels 16 and 17 and through a cross-beam member 26 interconnected with the front ends of the beam members 14 and 15 and through braces 27 and direct connection with the beam member 26 as best seen in Figure 3.

The rear extremity or discharge end 28 of the deck is positioned at the intake nip 29 defined between the forward sides of upper and lower crushing rolls 30 and 31 which are of the same length as the pickup to gather and receive the wide swath of hay therethrough, the crushing rolls being disposed in opposed relationship and the lower roll having a center shaft 32 carried by bearing blocks 33 and 34 at opposite ends, the block 33 operating within a vertical slot 36 in the panel 17 and the block 34 operating within a vertical slot 37 in the wall 16, the blocks 33 and 34 being spring urged upwardly by means of springs 38 39 compressed between the undersides thereof and the respective beam members 14 and 15, as well seen in Figures 2 and 3, whereby the bottom crushing roll 31 is urged upwardly into pressing engagement with the upper roll 30 which comprises a center shaft 40 journalled at opposite ends in suitable bearings mounted on the walls 16 and 17.

The upper and lower rolls 31 and 32, in addition to crushing the material, compact it and discharge at their discharge or rear sides 41 into troughs 42 and 43 positioned adjacent to opposite ends thereof, the troughs extending approximately one-third the length of the rolls inwardly from opposite ends of the unit, each trough having a forward edge 44 positioned in scraping relationship to the periphery of the bottom roll 31 and in receiving relationship to the discharge outlet 41 as seen in Figure 3. The troughs 42 and 43 encompass the rear and bottom sides of inwardly open augers 45 and 46 respectively, the auger 45 having a core 47 connected to a center shaft 48 therewithin and which is carried in a suitable bearing 48' mounted on the panel wall 16. The core 47 of the auger 45 is provided with a dextrorsal flight or spiral 49' which peripherally passes in close proximity to the periphery 50 of the upper roller 30 in wiping relationship thereto for removing any hay and the like which may tend to wind thereabout. Similarly the auger 46 is provided with a center core 51 which is open toward the center of the unit, the core 51 being connected to a shaft 52, therewithin and which is suitably supported in a bearing 53 mounted on the wall 17, the shaft 52 projecting outwardly of the wall 17. The core 51 also is provided with a sinistrorsal fin or spiral screw 54 which peripherally passes in close proximity to the periphery 50 of the upper roll for wiping crops therefrom. It will be seen that the outboard extremity of the trough 42 is suitably connected to the wall 16 and that the rear upper extremity is connected to a cross beam 55 which extends between the rear extremities of the walls 16 and 17 and connected thereto as by welding. The augers 45 and 46 discharge toward the center of the windrower into a discharge opening 58 defined between adjacent ends of the troughs 42 and 43 and disposed along the medial or center portions of the rollers 30 and 31. The opening 58 has a tedding drum, generally designated 59, disposed therein, said tedding drum comprising a center core 60 connected to a shaft 61, the shaft 61 being journalled at opposite ends from the members 14 and 15 on an axis generally parallel to the axes of the auger shafts and the rollers 30 and 31. The core 60 carries a plurality of radially outwardly extending paddles 62, 62 which are of such length that they pass in close proximity to the periphery 63 of the bottom roller along the medial portion thereof and project through the opening 58 between the adjacent ends of the troughs 42 and 43. The tedder drum thus disposed in receiving relationship to the augers 45 and 46 is adapted to be rotated at such speed as to flock up the hay being deposited thereon and to discharge it onto the ground thereover in a fluffy condition. It will be noted that the axis of rotation of the tedding drum is below the troughs.

The drive for the mechanism is in the form of a shafting 65 adapted for connection at one end 66 to the power takeoff of an associated tractor and the shafting 65 driving through a bevel gear assembly 67 which is carried on a cross member 68 interconnecting the legs 9 and 10 of the hitch yoke 11 intermediate their ends. The gear train 67 drives a shaft 69 which at one end is provided with a sprocket 70 keyed thereto driving a chain 71 trained thereabout and trained about a sprocket 72 which is keyed to the shaft 40 of the upper roll 30. The shaft 40 is provided with another sprocket 73 keyed thereto and driving a chain 74 which drives a sprocket 75 keyed to the shaft 52 of the auger 46. The shaft 40 is further provided with a pulley 76 which drives a reverse crossed belt 77 trained about a pulley 78 which is keyed to the shaft 61 of the beater roll assembly 59 and driving it in the direction indicated by the arrow in Figure 3. The shaft 40 is further provided with another sheave 80 constrained for rotation therewith and driving a reversed or crossed belt 81 which drives a sheave 82 keyed to the shaft 20 of the pickup drum 21 and driving it in the direction indicated by the arrow in Figure 2.

The shaft 69 is also provided with another sprocket 83 which drives a chain 84 which is trained about a sprocket 85 keyed to the shaft 48 of the auger 45 and driving it in the direction indicated by the arrow in Figure 3.

*Mode of operation*

In operation the windrower 2 is pulled with its forward end 90 forwardly along the ground whereupon the drum 21 picks up the hay 23 and deposits it onto the deck 24 and shifts the crop into the nip 29 of the crushing rolls which in turn pull the crop therebetween and crush it and discharge it at their center portions onto the beater 59 and at their opposite end portions into the respective auger troughs or trays 42 and 43 whereupon the augers move the matted hay, while partially loosening it into the opening 58 whereat it is discharged into the beater 59 which throws and fluffs the crop thereover to the ground in a loose windrow.

The center portion 91 of the upper roll is scrapingly associated on its back or discharge side with the forward edge 92 of a deflector or guide compressor assembly 93 which is constituted of a plurality of curved fingers 94 carried by a bracket structure 95 from the cross beam 55 above the axis of the augers as best seen in Figure 3.

The drum 59 passes peripherally close to the center portion of the roll 31 for scraping the hay therefrom.

What is claimed is:
1. In a hay processing machine having a mobile frame with a forward crop pickup means and crushing means therebehind comprising a pair of cooperatively associated opposed rolls having a forward side disposed in receiving relationship to said pick-up means and having a rear discharge side, the improvement comprising: means for windrowing and fluffing the crushed and compressed crops discharging from said crushing rolls and including a pair of trays carried by said frame at opposite ends of said rolls along said discharge side in scraping relationship to one of said rolls at said ends thereof and defining a discharge opening therebetween rearwardly of said rolls, an open end auger in each tray carried by said frame, each auger disposed generally parallel to said rolls and having a flight disposed in sweeping relationship to the related end of the other of said rolls and having a discharge end at said opening, a tedding drum carried by said frame and extending through said opening in direct receiving relationship to said rolls intermediate said augers and having opposite ends disposed in direct receiving relationship to the discharge ends of said augers and having a peripheral extent in sweeping relationship to the portion of said one roll between said augers.

2. The combination according to claim 1 and guide means carried by said frame directly over said tedding drum and having an edge disposed in scraping relationship to said other roll in an area intermediate said augers.

3. In a combined hay crop crushing and tedding field unit having an ambulant frame carrying a crop pick-up and a pair of crushing rolls having intake and discharge sides with the former positioned in receiving relationship to said pick-up, the improvement comprising a pair of lateral conveying means on the frame and disposed respectively at opposite ends of said rolls in receiving relation to the said discharge side thereof and operable to move the crop toward the center, and tedding means carried by the frame intermediate said conveying means in receiving relationship thereto and to the adjacent portion of said crushing rolls and having a discharge for the crop upon the ground in a loose windrow.

4. For use in a cut hay crop processing machine of the type embodying an ambulant frame with a pair of opposed cooperatively associated crushing rolls having a feed intake at one side and means for delivering cut crops thereto; the combination of a windrower and tedder carried by the frame to receive compacted, crushed crops from said crushing rolls and deliver it into a windrow and comprising a pair of conveyors carried on the frame behind opposite ends of said crushing rolls and extending lengthwise generally parallel to said rolls and spaced apart at adjacent ends to define a discharge opening behind the center portions of said rolls, and a rotary tedding drum extending peripherally into said opening and carried on the frame on an axis generally parallel to said rolls for receiving the crops from said conveyors and the center portion of said crushing rolls to fluff said crops and deposit them in a windrow upon the ground.

References Cited in the file of this patent
UNITED STATES PATENTS

| | | |
|---|---|---|
| 24,386 | Goff | June 14, 1859 |
| 747,507 | Thach | Dec. 22, 1903 |
| 2,345,715 | Reed | Apr. 4, 1944 |
| 2,517,413 | Pearson | Aug. 1, 1950 |
| 2,663,985 | Hinson | Dec. 29, 1953 |
| 2,664,684 | Russell | Jan. 5, 1954 |